(12) United States Patent
Shin et al.

(10) Patent No.: US 9,142,128 B2
(45) Date of Patent: Sep. 22, 2015

(54) ACCIDENT ALERT SYSTEM FOR PREVENTING SECONDARY COLLISION

(71) Applicant: LOC&ALL, Inc., Seoul (KR)

(72) Inventors: Myoung Jin Shin, Seoul (KR); Kwang Jin Oh, Seoul (KR); Hee Man Park, Gwangmyeong (KR)

(73) Assignee: LOC&ALL Inc. (KR)

( * ) Notice: Subject to any disclaimer, the term of this patent is extended or adjusted under 35 U.S.C. 154(b) by 57 days.

(21) Appl. No.: 13/969,800

(22) Filed: Aug. 19, 2013

(65) Prior Publication Data

US 2014/0049406 A1 Feb. 20, 2014

(30) Foreign Application Priority Data

Aug. 20, 2012 (KR) .......................... 10-2012-0090917

(51) Int. Cl.
| | | |
|---|---|---|
| *G08G 1/0967* | (2006.01) | |
| *G08G 1/01* | (2006.01) | |
| *G08G 1/16* | (2006.01) | |
| *G01C 21/36* | (2006.01) | |

(52) U.S. Cl.
CPC ...... *G08G 1/096791* (2013.01); *G01C 21/3697* (2013.01); *G08G 1/0112* (2013.01); *G08G 1/0133* (2013.01); *G08G 1/0145* (2013.01); *G08G 1/096708* (2013.01); *G08G 1/096716* (2013.01); *G08G 1/096741* (2013.01); *G08G 1/096775* (2013.01); *G08G 1/164* (2013.01)

(58) Field of Classification Search
CPC .................. G08G 1/096708; G08G 1/096716; G08G 1/0104

USPC ................. 340/905, 934, 995.13; 701/119; 342/457

See application file for complete search history.

(56) References Cited

U.S. PATENT DOCUMENTS

| | | | | |
|---|---|---|---|---|
| 5,777,580 A | * | 7/1998 | Janky et al. | 342/457 |
| 6,012,012 A | * | 1/2000 | Fleck et al. | 701/117 |
| 6,643,587 B2 | * | 11/2003 | Brodie et al. | 342/457 |
| 8,050,855 B2 | * | 11/2011 | Coy et al. | 340/905 |
| 8,552,886 B2 | * | 10/2013 | Bensoussan | 340/905 |

FOREIGN PATENT DOCUMENTS

| | | |
|---|---|---|
| JP | 2005-534100 A | 11/1990 |
| JP | 07-047866 | 2/1995 |
| JP | 2002-208080 A | 7/2002 |
| JP | 2002-234411 A | 8/2002 |
| JP | 2007-072597 A | 3/2007 |
| JP | 2011-123720 A | 6/2011 |
| KR | 2011-0066884 A | 6/2011 |
| WO | WO-2004-010401 A2 | 1/2004 |

* cited by examiner

*Primary Examiner* — John A Tweel, Jr.
(74) *Attorney, Agent, or Firm* — Harness, Dickey & Pierce, P.L.C.

(57) ABSTRACT

The present disclosure provides an accident alert system for preventing secondary collisions. The system for preventing a secondary accident comprises a terminal configured to have a global positioning system (GPS) navigation capability, monitor and display a driving state and an accident state of a vehicle, transmit information on a driving state and the accident state via a communication network, and display information received on a screen; and a server platform configured to exchange information with the terminal, include an algorithm for determining the occurrence of an accident based on the information on the driving state and the accident state received from the terminal and traffic information, and inform other terminals of the occurrence of the accident.

12 Claims, 19 Drawing Sheets

(a)

(b)

(a)

(b)

ACCIDENT ALERT SYSTEM FOR PREVENTING SECONDARY COLLISION

RELATED APPLICATIONS

The present application is based on, and claims priority from, Korean Patent Application Number 10-2012-0090917, filed Aug. 20, 2012, the disclosure of which is hereby incorporated by reference herein in its entirety.

TECHNICAL FIELD

The present disclosure in some embodiments relates to an accident alert system for preventing secondary collisions. More particularly, the present disclosure relates to an accident alert system for preventing secondary collisions by monitoring vehicle's driving status in real time for possible occurrence of an accident to help nearby drivers keep alert.

BACKGROUND

The statements in this section merely provide background information related to the present disclosure and may not constitute prior art.

As sensors provide more various functions and the mobile communication has evolved to accommodate the processing of information, the system for transmitting traffic conditions has been developing. However, technologies have been commercialized that relies the perception of the accident on human and apprises nearby drivers of the occurrence of the accident since the transmitted information is limited so as to include a traveled distance and a speed of the vehicle.

Conventional solutions resort to relaying individual report and are incapable of perceiving, informing or alerting the accidents in real time since it is impossible for individuals to acknowledge the driving information on thousands of vehicles or to determine whether there occurred an accident. Highway accidents are particularly vulnerable to secondary accidents which occur within very short time while nearby or passing-by drivers do not recognize the accident, and therefore conventional technologies cannot effectively prevent the secondary accidents from occurring.

SUMMARY

In accordance with some embodiments, a system for preventing a secondary accident comprises a terminal and a server platform. The terminal is configured to have a global positioning system (GPS) navigation capability, monitor and display a driving state and an accident state of a vehicle, transmit information on a driving state and the accident state via a communication network, and display information received on a screen. The server platform is configured to exchange information with the terminal, include an algorithm for determining an occurrence of an accident based on the information on the driving state and the accident state received from the terminal, and inform other terminals of the occurrence of the accident.

Another embodiment of the present disclosure provides a method for preventing a secondary accident, comprising detecting and determining an accident of a vehicle based on information on a speed, an acceleration and a location of the vehicle; detecting an occurrence of an impact by analyzing the speed and acceleration; analyzing an occurrence of an accident based on whether the vehicle is stopped due to the impact or not; determining the occurrence of the accident if the vehicle is determined to be stopped for a certain duration of time and determining and notifying the accident to an accident analysis system and to the nearby vehicles and confirming the occurrence of the accident; receiving a signal for confirming the occurrence of the accident from the accident analysis system and displaying the signal; and determining the accident to be cleared if the vehicle moves since the detecting of the accident.

Yet another embodiment of the present disclosure provides a system for preventing a secondary accident, comprising a terminal and a server platform. The terminal is configured to have a global positioning system (GPS) navigation capability, monitor and display a driving state and an accident state of a vehicle, transmit information on a driving state and the accident state via a communication network, display information received on a screen, and detect an occurrence of an impact. The server platform is configured to exchange information with the terminal, include an algorithm for determining an occurrence of an accident based on the information on the driving state and the accident state received from the terminal, and inform other terminals of the occurrence of the accident. Here, the terminal analyzes an acceleration measured by using an accelerometer provided on the vehicle to detect the impact and determine the occurrence of the accident through determining whether the vehicle is stopped or not based on the driving state at the occurrence of the impact and to transmit information on whether the vehicle is in an accident to the server platform.

Yet another embodiment of the present disclosure provides a system for preventing a secondary accident, comprising a terminal and a server platform. The terminal is configured to have a global positioning system (GPS) navigation capability, identify information on a driving state, impact information and stop information of a vehicle from an acceleration which is received or measured by the terminal, transmit the information on the driving state, impact information and stop information via a communication network, and process and display information received on a screen. The server platform is configured to exchange information with the terminal, include an algorithm for determining an occurrence of an accident based on the information on the driving state, impact information and stop information received from the terminal, and inform other terminals of the occurrence of the accident. Herein, the algorithm is configured to receive the impact information transmitted from the terminal and inform nearby terminals of the imminence of the accident, and confirm the occurrence of the accident based on whether the vehicle under the impact is stopped or not and on speeds of nearby vehicles.

REFERENCE NUMERALS

Figure 1:
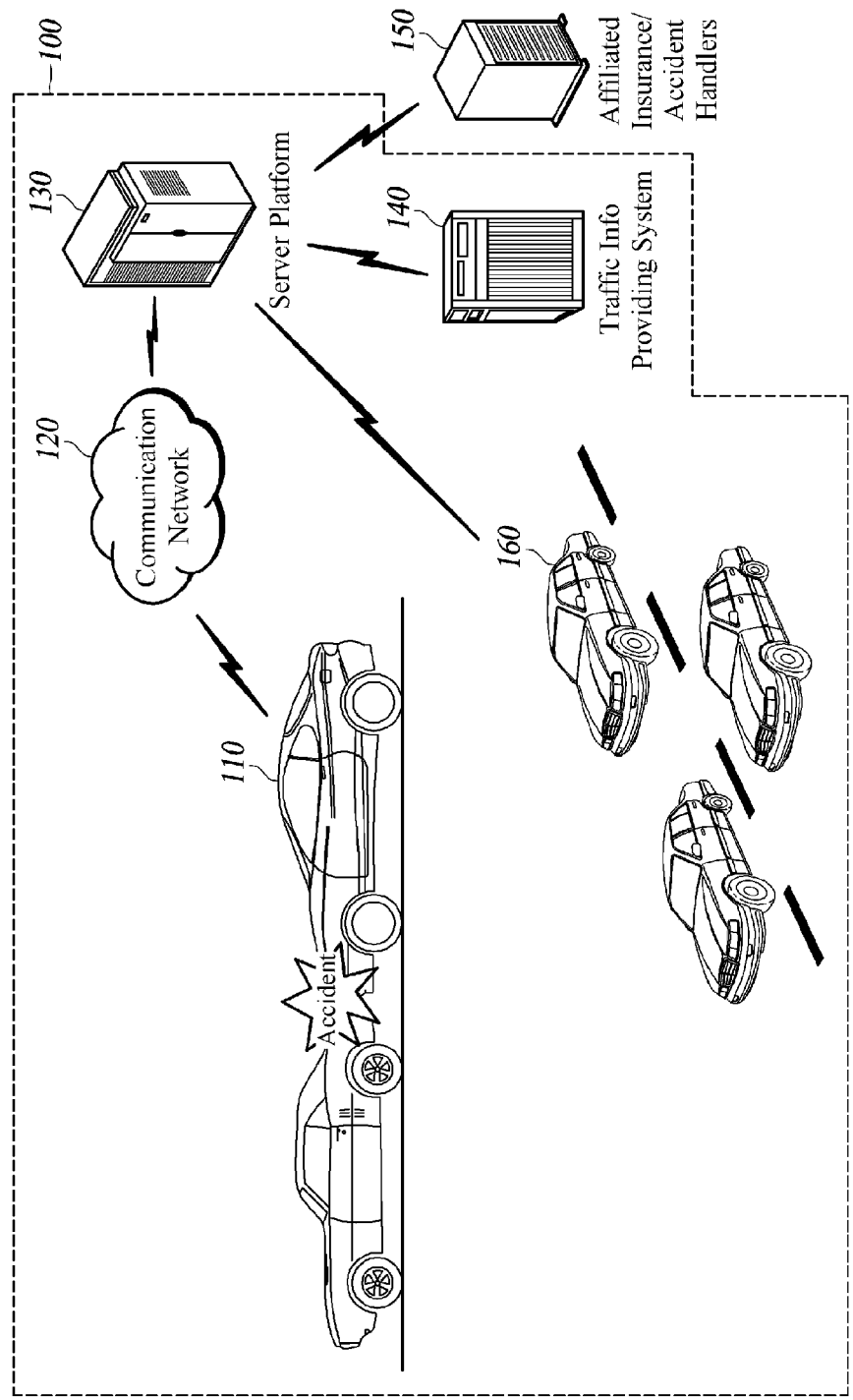
FIG. 1 is a schematic diagram of a system for preventing a secondary accident according to at least one embodiment of the present disclosure.

| | |
|---|---|
| 100: System for Preventing Secondary Collision | |
| 110: Crashed Vehicle | 120: Communication Network |
| 130: Server Platform | 140: Traffic Info Providing System |
| 160: Nearby Vehicle | 910, 930: Acceleration at Collision |
| 920, 940: Acceleration at Rebound | |

DETAILED DESCRIPTION

The present embodiment provides a technology for preventing a secondary collision by determining the occurrence of an accident in real time and alerting other drivers of the accident information.

Hereinafter, at least one embodiment of the present disclosure will be described in detail with reference to the accompanying drawings.

In the following description, like reference numerals designate like elements although the elements are shown in different drawings. Further, in the following description of the at least one embodiment, a detailed description of known functions and configurations incorporated herein will be omitted for the purpose of clarity and for brevity.

Additionally, in describing the components of the present disclosure, terms like first, second, A, B, (a), and (b) are used. These are solely for the purpose of differentiating one component from another, and one of ordinary skill would understand the terms are not to imply or suggest the substances, order or sequence of the components. If a component is described as 'connected', 'coupled', or 'linked' to another component, one of ordinary skill in the art would understand the components are not necessarily directly 'connected', 'coupled', or 'linked' but also are indirectly 'connected', 'coupled', or 'linked' via a third component.

FIG. 1 is a schematic diagram of a system for preventing a secondary accident according to at least one embodiment of the present disclosure.

If an accident occurs, a terminal equipped in a vehicle 110 involving in the collision collects data required for determining the occurrence of the accident and transmits the data through a communication network 120 to a server platform 130 which operates to determine the occurrence of accident. Server platform 130 utilizes a predetermined algorithm to determine whether an accident or event occurs by analyzing the received data and receives traffic information from a traffic information providing system 140 to perform search for a route considering the presence or absence of accident. Alternatively, server platform 130 provides the accident information to an insurance/accident management company 150 and to the terminals of nearby vehicles 160. Although the present embodiment depicts nearby vehicles 160 similar to the crashed(accident-involved) vehicle 110 as having terminals for exchanging data associated with an accident with server platform 130, the crashed vehicle 110 may represent a one-way messenger terminal for delivering the accident information to server platform 130 while nearby vehicles 160 represent terminals adapted to simply receive judgment data from server platform 130. In addition, the functionality of traffic information providing system 140 may be incorporated into server platform 130 which can then generate the traffic information without the traffic information providing system 140. Affiliated insurance/accident management company 150 as used in the present embodiment are exemplary and they may be optionally included.

Figure 2:
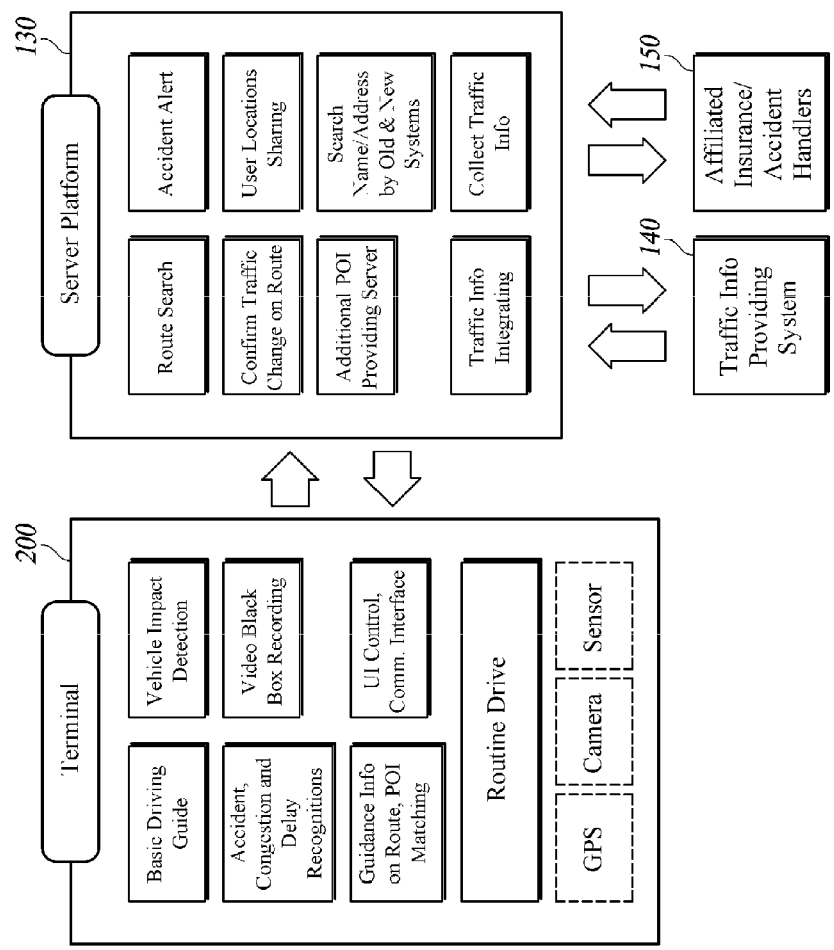
FIG. 2 is a block diagram of the system for preventing a secondary accident depicted in FIG. 1.

FIG. 2 is a block diagram of the system for preventing a secondary accident depicted in FIG. 1. A terminal 200 is provided in a vehicle. Terminal 200 may be a versatile navigator capable of providing a basic driving guide, guidance information on route, POI (point of interest) matching, UI (user interface) control, communication interface, locations, camera control functionality, etc. Terminal 200 can acquire outside situation through the functions of a GPS navigation, camera and sensor.

Exchanging data with terminal 200, server platform 130 is adapted to perform various functions such as a route search, accident alert, notice of traffic change on route, user locations sharing, additional POI provision, search for name/address by old & new systems, traffic information integration and traffic information collection. Server platform 130 processes data received from terminal 200 and provides processed data to nearby terminals. There may be additional affiliated organizations which make data exchange with server platform 130, including a traffic information provider or affiliated insurance/accident management company.

The aforementioned second accident preventive system may use technologies as listed in Table 1:

TABLE 1

| Developed Technology Classification | Subcategory Technologies |
|---|---|
| Video Event Data Recorder or Black Box and Communication-based Navigation Technology | Default Navigation Information Technology |
| | GPS positioning map matching technology |
| | Camera Control Technology (Black Box) |
| | Image Trajectory Matching Technology |
| | Image-based Guided Destination & POI Expression Technology |

TABLE 1-continued

| Developed Technology Classification | Subcategory Technologies |
|---|---|
| Accident Recognition Technology that Utilizes Sensors and Traffic Information | Pathwise Road Attributes and Information Analysis Technology<br>Pathwise Traffic Info Acquisition and Actual Speed Data Analysis<br>Algorithm of Accident Recognition by Using Terminal Sensor, GPS and Traffic Info<br>Accident Video Extraction with Black Box Video<br>Transmission of Black Box and Accident Point by Utilizing Compression Technology<br>Accident Info Reception & UI Control |
| Communication-based Navigation and Location Info Sharing Server Technology | Route Search & Information Generation Technology<br>Real-time Traffic Info Analysis & Management Technique<br>Automatic Checking of Path Change<br>Location Search Technology<br>POI Management Technology<br>Location Info Sharing Technology |
| Accident Alert Information Technology | Accident Info Analytical Technique<br>Processing Technology of Video Info & Location of Accident<br>Search for Relevant Users to Receive Accident Info & Info Transmission Function |

Server platform 130 has a communication-based navigation capability including a route search and information generation. Server platform 130 enables a secondary accident prevention by analytically processing information on accident and sending alert thereof to the user. Terminal 200 provides the user with driving information received from the server platform. The terminal is capable of detecting an impact to the vehicle and perceiving an accident situation performing control of the GPS, camera, sensor and other devices or functions.

With the assistance of the aforementioned technologies, some specific features for collecting a driving state of a driver and a relevant accident information and checking whether an accident is managed are listed in Table 2:

TABLE 2

| Functionality | Method | Related Technology |
|---|---|---|
| Transmission and Detection of Highway Accident | Accident Info is Acquired by Collision Impact from Sensor<br>Check Stop State from GPS & Speed Info<br>Confirm the Road Info in This Section is from Highway<br>Transmit Accident Info & Black Box Video Info to Server | Communication-based AR Navigation<br>Video Event Data Recorder or Black Box Sensor & Traffic Info<br>Communication-based Navigation Platform |
| Stopping Detection | Confirm Stopping from GPS & Speed Info<br>Confirm the Road Info is from Highway, But Rest Stop<br>Transmit Relevant Info to Server | Communication-based AR Navigation<br>Communication-based Navigation Platform |
| Accident Handling Completion and Clearance | Collect Either Speed Info of Vehicle Passing Through This Section Or the Vehicle Traveling Info<br>Notify Clearance of Accident by Push Technology | Communication-based Navigation Platform<br>Accident Alert Information Technology |

TABLE 2-continued

| Functionality | Method | Related Technology |
|---|---|---|
| Accident Info Alert | Search for Car to be Passing Through This Section<br>Alert Relevant Cars of Accident Info by Push Technology | Location Info Sharing Platform<br>Accident Alert Information Technology |

In the event of a car accident which eventually stops one or more vehicles, the occurrence of the accident can be determined by checking whether there is an impact and then confirming whether there is a stoppage.

To confirm the accident, the present information uses the location, acceleration and image information at the time of the accident. To detect the stoppage, GPS, speed information and road information are received and transmitted to server platform 130.

The occurrence of an accident should decrease the speed of nearby cars followed by recovery of their speed upon completion of the accident management, which can be analyzed to confirm the accident and to determine whether the accident management is completed.

Upon the occurrence or clearance of an accident, the vehicles passing through the relevant section of the road are searched for and are informed of the accident.

Figure 3:
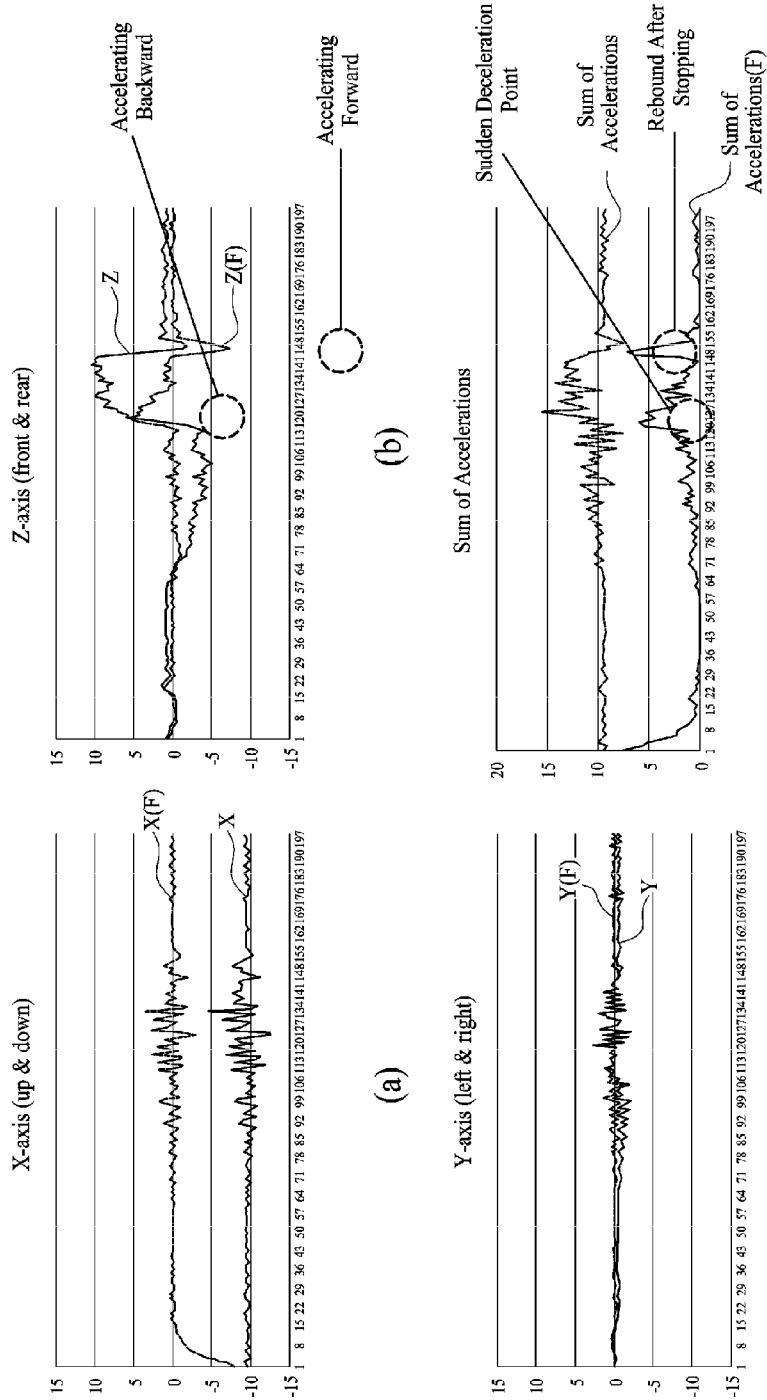
FIG. 3 is the graphs of accelerations measured by an accelerometer for providing information to a terminal according to an embodiment.

FIG. 3 is the graphs of accelerations measured by an acceleration sensor for providing information to a terminal according to an embodiment. Acceleration is a vector quantity and one sensor measures the acceleration in one direction. It requires at least three sensors for measuring accelerations in three directions. The acceleration measured by each sensor is first processed by a high-pass filter to generate a value to be analyzed. FIG. 3 illustrates graph (a) of X-axis or rostrocaudal axis, (b) of Z-axis in longitudinal directions and (c) of Y-axis in lateral directions. Graph (d) is a sum of accelerations measured on X, Y and Z-axes after the high-pass filtering. X(F), Z(F) and Y(F) represent the high-pass filtered values of the respective values of X, Z and Y axes.

The graphs in FIG. 3 represent exemplary accelerations measured upon a sudden stop after a 20 km (or 12.4 mile)

cruise(constant speed), wherein the left and right accelerations are a noise occurred during the cruise but the Z-axis acceleration measured front and rear is the only value for monitoring a deceleration causing acceleration changes. At the sudden stop, the acceleration rearward first increases until it starts to decrease by a certain rate before a complete stop which is followed by a temporary generation of the acceleration forward due to a rebound. This acceleration plot is processed into a filtered plot as shown at FIG. 3 (b) on which mean values are normalized to 0 and a section having a large change of acceleration can be selectively extracted. This clearly shows the time when the sudden deceleration, stop and rebounding occurred. FIG. 3 assumes vehicles accelerating forward and backward, which represents a collision occurring front and rear between the colliding vehicles. A perpendicular or diagonal broadside collision generates shocks on Y-axis or Y and Z-axes. Therefore, the sum of the accelerations on X, Y and Z-axes is generated as graph (d) to be used in determining the occurrence of an accident.

Figure 4:
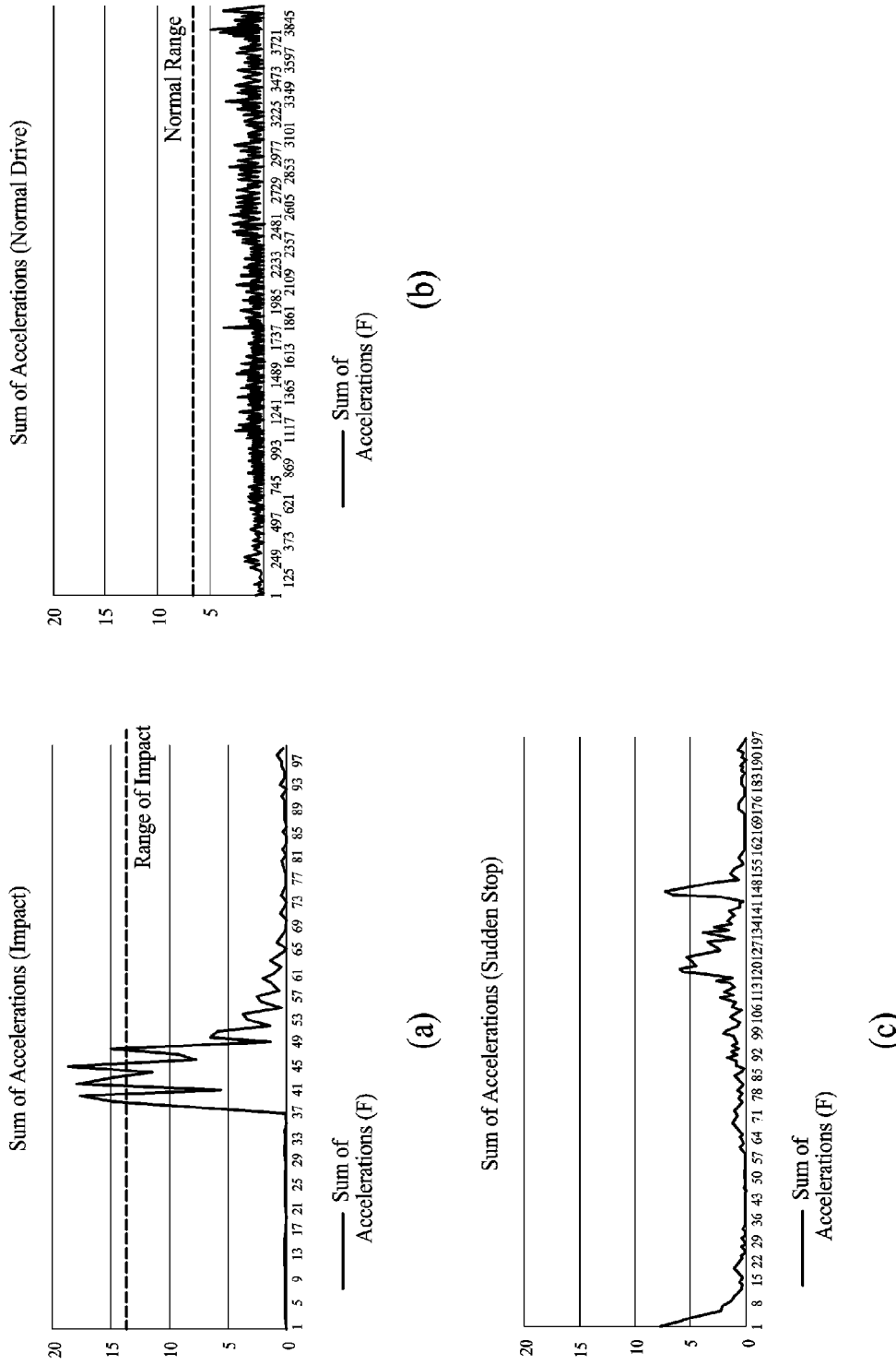
FIG. 4 is the graphs of the sums of accelerations measured by an acceleration sensor according to an embodiment.

FIG. 4 is the graphs of the sums of accelerations measured by an acceleration sensor according to an embodiment. A surge of the sum of accelerations above a threshold as in FIG. 4 (a) may imply an impact or collision. Still, even the sum of accelerations in above-normal level may evoke a suspicion of an accident when it occurs rapidly. For example, in the case of an impact due to unevenness of the road or a shock due to a sudden emergency stop, the resultant surge of the sum of accelerations may not constitute an accident. A slowly occurred acceleration at a sudden stop as in graph (c) may be distinguished from the situation of the impact as the acceleration surge is measured low. In a normal drive as at (b), no abrupt changes in the acceleration are measured.

Figure 5:
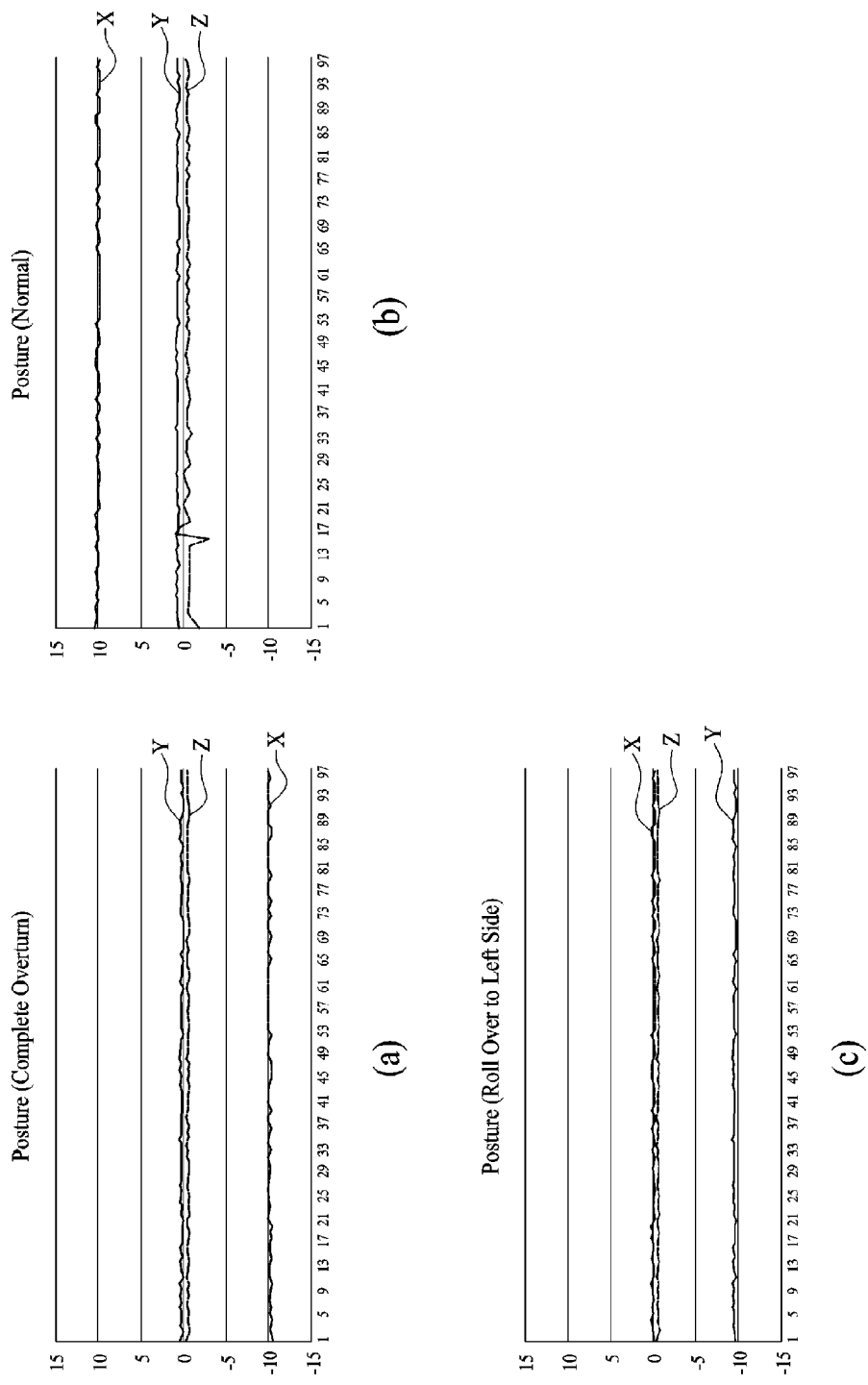
FIG. 5 is the graphs of accelerations measured by using an acceleration sensor by vehicle posture according to an embodiment.

FIG. 5 is the graphs of accelerations measured by using an acceleration sensor by vehicle posture according to an embodiment. X, Y and Z indicate accelerations in the vertical direction, lateral direction and longitudinal direction, respectively. Graph (b) shows a normal posture, in which the gravitational acceleration is only measured in the X-axis, leaving the others as 0. However, in the event of a vehicle overturn (upside down) as in (a), the inverse of the gravitational acceleration is measured along the X-axis. A lateral roll over does not incur a measurement of gravitational acceleration in the X-axis but measurement thereof in the Y-axis. If the vehicle falls to the left side as shown at (c), the acceleration of only Y-axis is measured. Therefore, whether an occurrence of overturning of the vehicle body can be confirmed by checking the relevant sensor in which the gravitational acceleration for each axis is measured.

Figure 6:
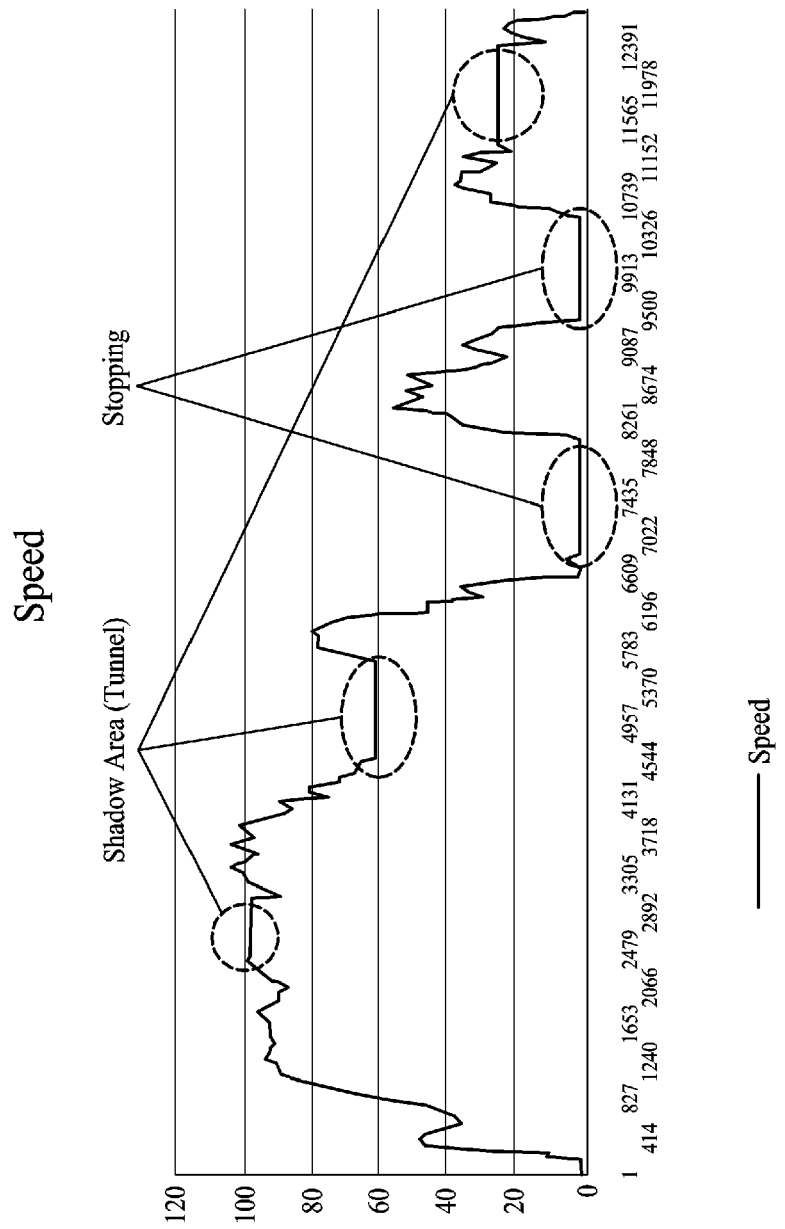
FIG. 6 is a graph of speeds obtained through a GPS analysis according to an embodiment.

FIG. 6 is a speed graph by a GPS speed analysis according to an embodiment. When analyzing the values of change in the velocity and position of the GPS data, the states of cruise, acceleration, deceleration and stop can be determined. An accident may be suspected of if the vehicle stays still on the highway, but it cannot be confirmed since the vehicle in some cases might be pulled over to the shoulder. Therefore, a simple analysis of whether there is a stop or not is not sufficient to determine the occurrence of an accident but "accident" is determined as being occurred at least if the determined accident as in FIGS. 4 and 5 is immediately followed by an occurrence of a section of the road with constant speed 0. Though the speed continually changes on the graph, the vehicle speed is measured as constant in the zero-speed sections and in the marked shadow areas. The zero-speed sections may be determined to represent vehicle stops but driving through tunnels and such areas disables measurement of the speed which leads to misjudgment of the vehicle stop in the shadow area as a constant-speed drive. Therefore, in the event of an impact in the shadow area, changes in the vehicle location are detected to determine whether the vehicle is stopped.

Figure 7:
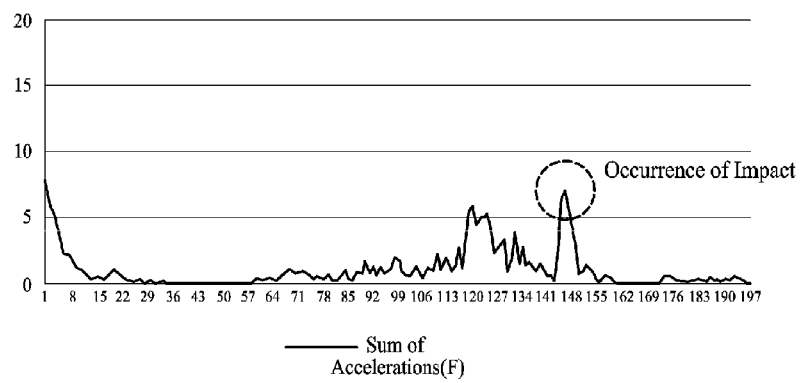
FIG. 7 is the graphs of the sum of accelerations and speeds at an accident measured according to an embodiment.
Figure 7:
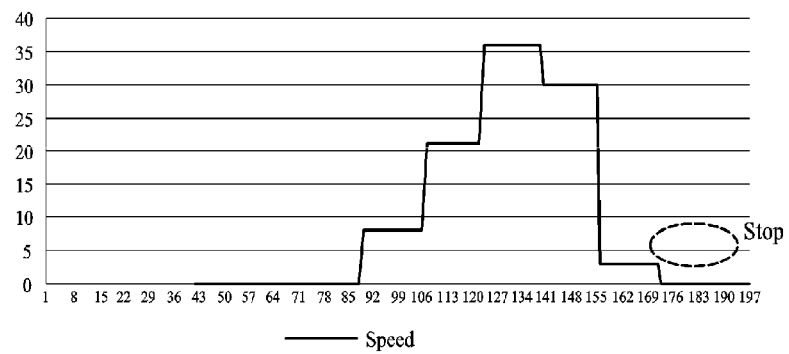

FIG. 7 is the graphs of the sum of accelerations and speeds at an accident measured according to an embodiment. As described in FIG. 6, the sum of accelerations is used to determine whether an impact has occurred and then the event of a continued stop confirms an "accident". In such case, a delayed determination interferes with the prevention of short-range secondary collisions. In response to a near-zero speed drop immediately after an impact, the present embodiment can immediately deliver 'suspect of accident' to a selected group of approaching terminals following behind within a several kilometers or miles from the impact location. If the accident occurs in a shadow area such as a tunnel, an accident cannot be identified because the measurement is made for the acceleration but not the speed. In response to an impact detected in the shadow area, whether there is a vehicle stop is determined based on the acceleration, traffic condition, etc. The server platform makes a second determination by considering changes in traffic of the reported area to determine the vehicle stop. Starting from a point encircled 'occurrence of impact' at (a), an abrupt drop of the speed is measured as shown at (b) to indicate a switch to 'stop'.

Figure 8:
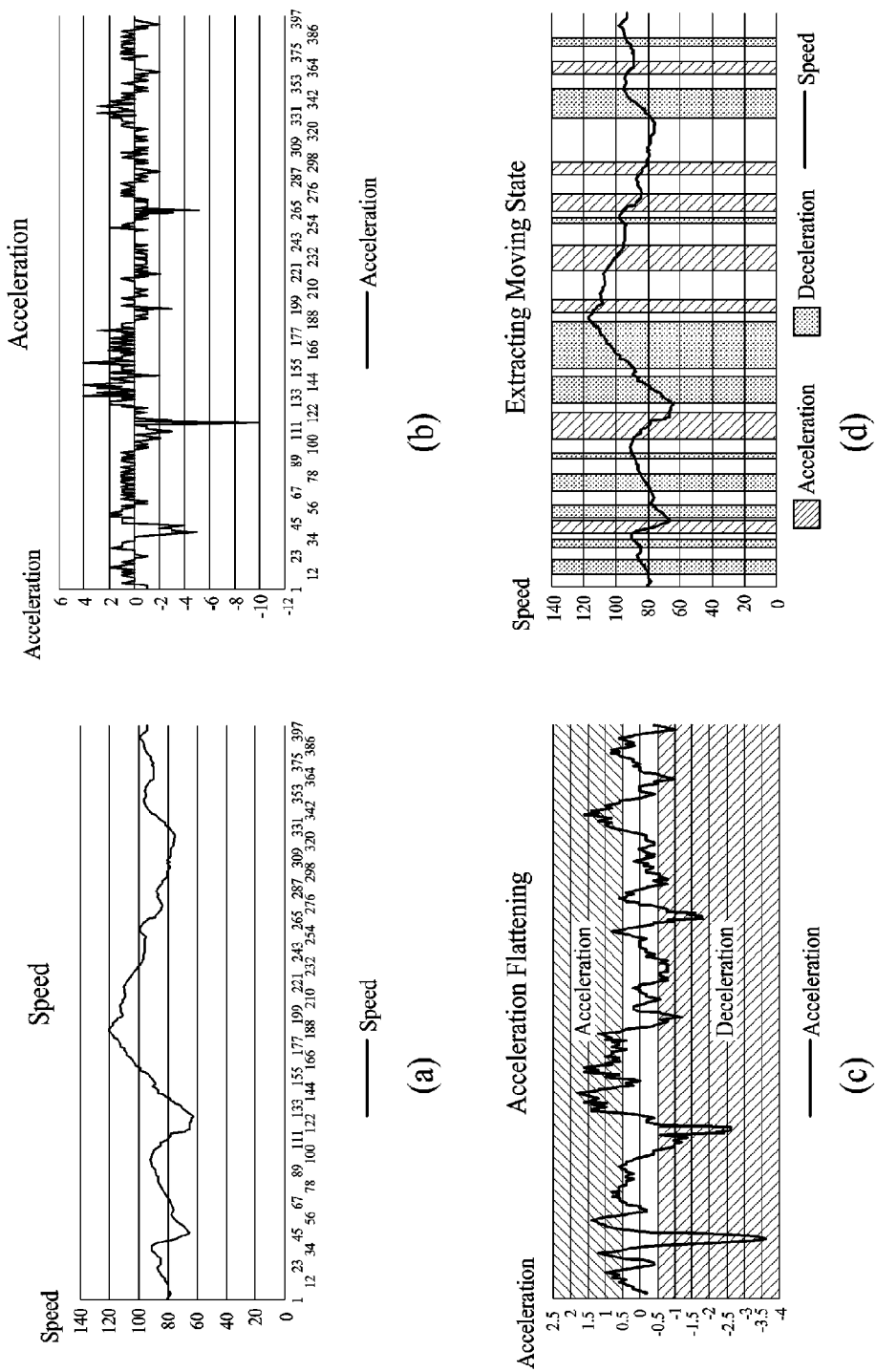
FIG. 8 is the graphs of an analysis of a movement condition by using GPS speed data and location data according to an embodiment.

FIG. 8 is the graphs of an analysis of a driving condition by using GPS speed data and location data according to an embodiment. The stop state is distinguished by monitoring the speed in graph (a), and the speed is analyzed to extract graph (c) of acceleration. Herein, the acceleration is overly sensitive to local changes in speed and therefore it is flattened by means such as a filter to obtain graph (c). As for acceleration exceeding a critical region, graph (d) is obtained by extracting the states of acceleration and deceleration from speed graph (a). This gives the specific driving conditions of the vehicle. For the shadow areas disabling an estimation of speed information, the stop and movement conditions are extracted by monitoring positional changes of the vehicle to make a second determination.

The situation of the road is analyzed by using routing information and traffic information supplied by a navigation client. Herein, the routing information is analyzed to extract the road information (tollgate, interchange, junction, rest stop or service area, road) and the traffic information is analyzed to produce the traffic condition (congestion, delay or smooth).

Receiving traffic data for the analysis of road conditions may need a separate traffic information provider or it can be locally obtained free from an authority such as the Korea Highway Corporation.

Referring to FIG. 8, types of stop state can be determined as classified in Table 3 by comparing the extracted information on stop and movement conditions with the road and traffic information. Table 3 is a status indicating when the vehicle is determined to be in stop state.

TABLE 3

| Road Information | Traffic State | Display |
| --- | --- | --- |
| Rest Stop | N/A | Stop (Rest Stop) |
| Intersection (Tollgate, Interchange, Junction) | N/A | Stop (Intersection), Stop after Extended Stay (Shoulder) |
| Road | Smooth | Stop after Extended Stay (Shoulder) |
| N/A | Congestion, Delay | Stop (Congestion), Stop after Extended Stay (Shoulder) |

Figure 9:
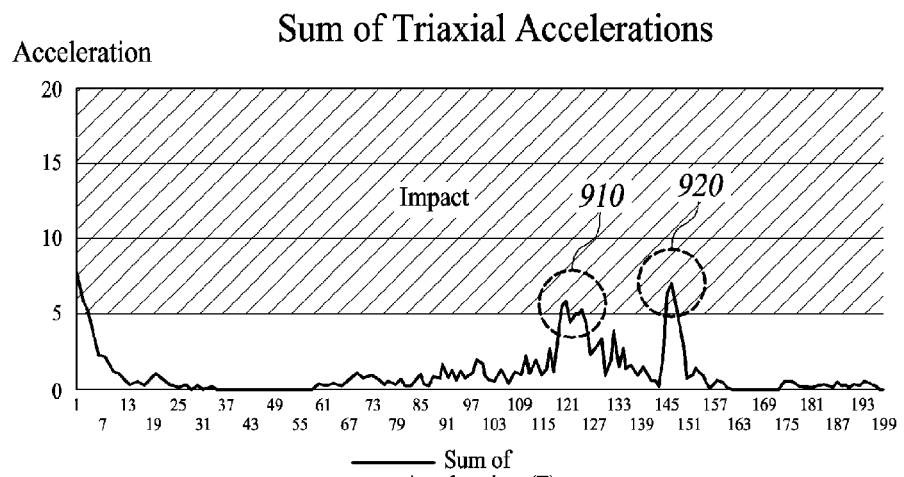
FIG. 9 is the graphs of the sum of triaxial accelerations and accelerations forward and backward for use in analyzing a collision state according to an embodiment.
Figure 9:
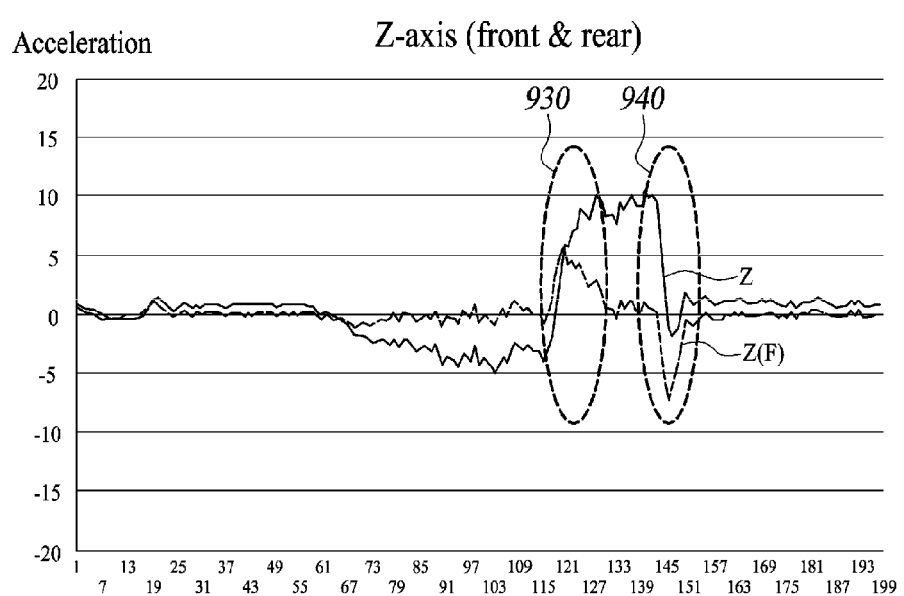

FIG. 9 is the graphs of the sum of triaxial accelerations and accelerations forward and backward for use in analyzing a collision state according to an embodiment. Graph (a) is for a sum of triaxial accelerations and graph (b) is an acceleration on Z-axis measured forward and backward. An acceleration sensor employed may be triaxial (X, Y, Z) sensors. The measurements of an acceleration are passed through a high-pass filter for the removal of any noises and their noise-eliminated absolute values are added to each other to obtain the graph of sum of triaxial accelerations. In (a), the 'impact' state is determined by the acceleration upon collision that is indicated by a supercritical summed acceleration 910 and another acceleration at rebound indicated at 920. From determining the shock state, the respective axial measurements are analyzed to produce the direction of the impact (Y-axis, Z-axis: front, rear, right and left). Additionally from (b), the acceleration at collision 930 and the acceleration at rebound are produced. Here, an Impact on X-axis (up and down) is detected as an impact with road surface irregularities to signal a switch to 'normal'.

Figure 10:
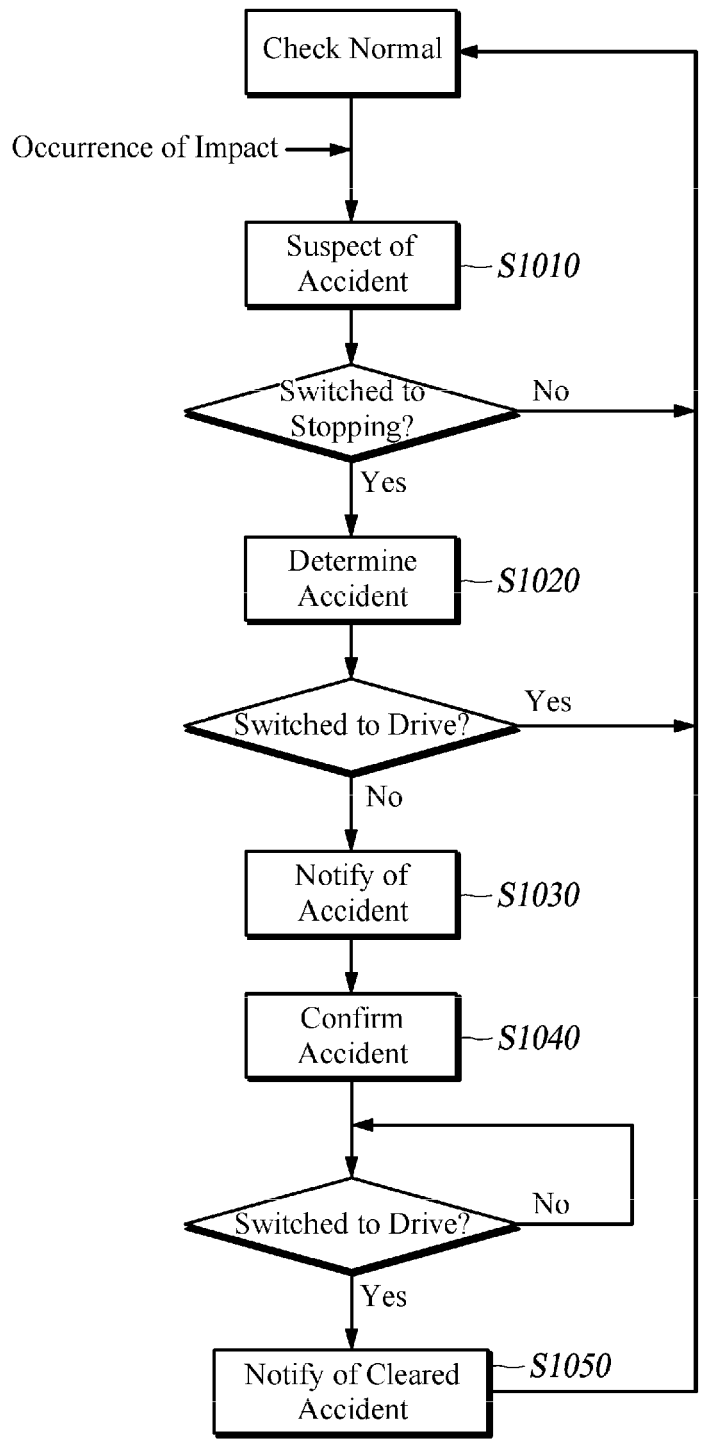
FIG. 10 is a flowchart of an accident determination algorithm according to at least one embodiment.

FIG. 10 is a flowchart of an accident determination algorithm according to at least one embodiment. This algorithm is generally used to determine the determination process on the server platforms as described in FIG. 1, but is not limited thereto. As described above, the algorithm is sufficient to be present between the process for accident determination based on the collected information on accelerations, speeds and locations from each terminal and the process for delivering the information to other terminals. Therefore, it should be construed to fall under the scope of the present disclosure to implement a circuit for determination in each terminal by applying the part of accident determination of the present algorithm and have the server platform remotely process an accident confirmation and accident alert. As an accident determination algorithm, it utilizes the determined impact as described in FIG. 9 and the determined drive condition as described in FIG. 8.

The initial state of accident maintains the 'normal' condition. By normal condition, it means the vehicle is in drive or at stop state.

Upon determining an occurrence of an 'impact' by utilizing acceleration and speed, the condition is switched to 'suspect of accident' at step S1010. At this time, the algorithm can notify this information to terminals following behind within e.g., several kilometers relative to the forward direction of the corresponding (host) terminal.

If the drive condition switches from 'suspect of accident' (S1010) to 'stop' within a predetermined duration of time, the condition converts to a state to 'occurrence of accident' at step S1020.

At the time of switching to 'determine accident', if the drive condition is monitored as switching from 'stop' to 'drive', the state of accident is switched back to 'normal'.

If the state is maintained as occurrence of accident' (S1020) for longer than a prescribed duration of time, a notification is issued to an accident analysis system at step S1030.

Upon receiving the "occurrence of accident" from the accident analysis system, the state turns to 'accident assured' at step S1040. Then, the accident analysis system analyzes the accident based on the traffic data provided by a traffic information provider (such as Korea Highway Corporation) or received overturn related data from respective terminals, whether trailing terminals of the corresponding terminal move at a speed substantially lower than the leading terminal, and other information on accident reports. The accident analysis system may further alert nearby terminals of whether the accident is actually occurred.

In the switched state to 'occurrence of accident', if the drive condition is monitored as switching to 'drive', a notification of "accident cleared" is issued to the accident analysis system at step S1050 and the state of accident returns to 'normal'. In other words, a continuous monitoring is made to determine whether there is a state conversion from the stop state to the 'occurrence of accident' to 'drive'.

Figure 11:
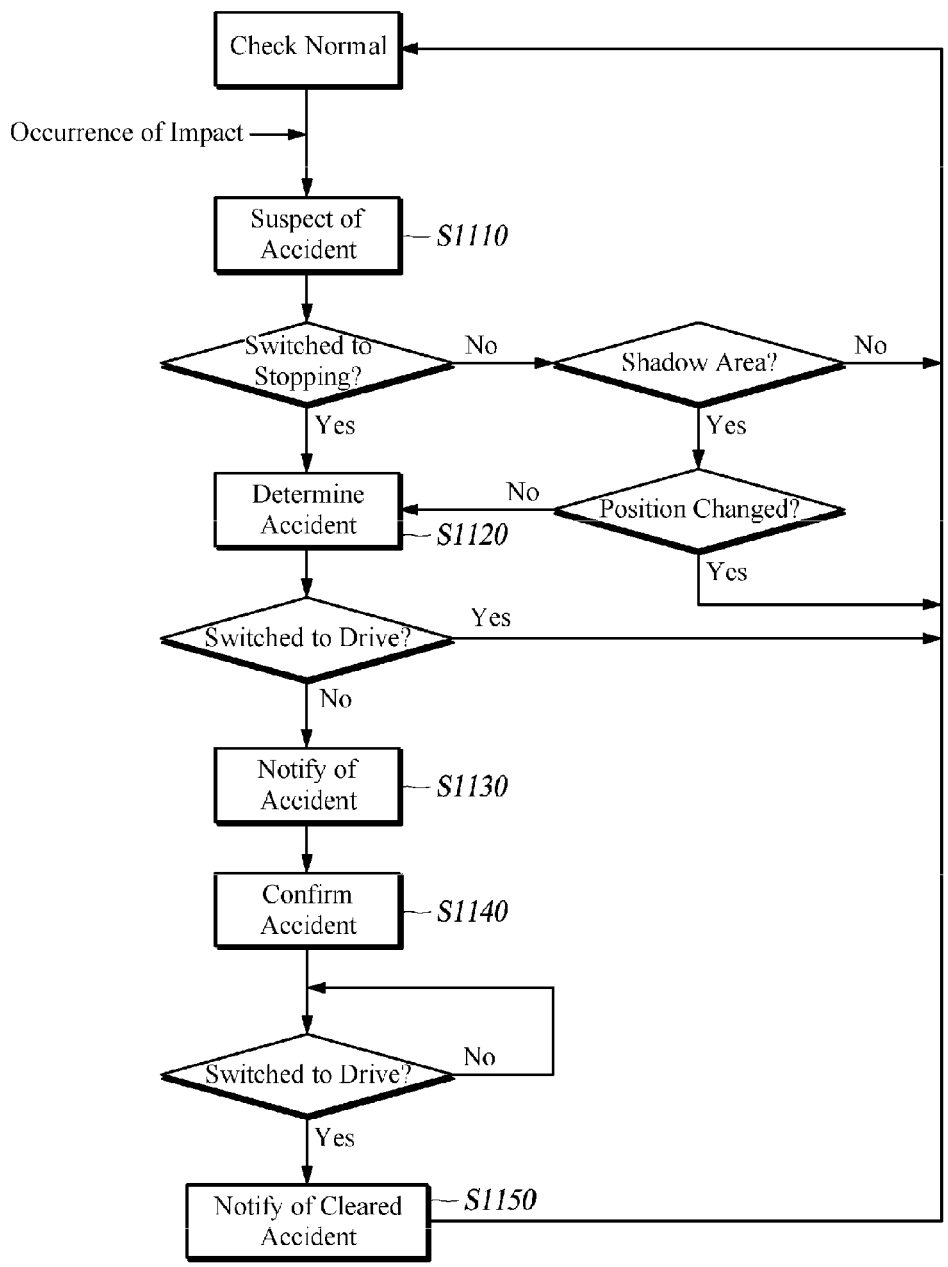
FIG. 11 is a flowchart of an accident determination algorithm with an improved determination in shadow area according to at least one embodiment.
Figure 12A:
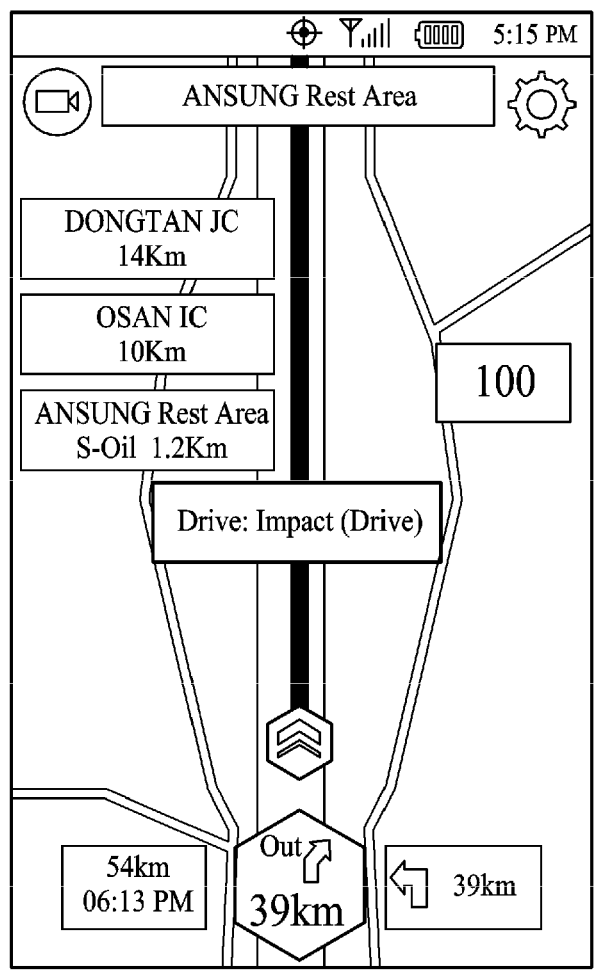
FIGS. 12A to 12F are diagrams of various display screens of a terminal for an accident detection and alert according to an embodiment.
Figure 12B:
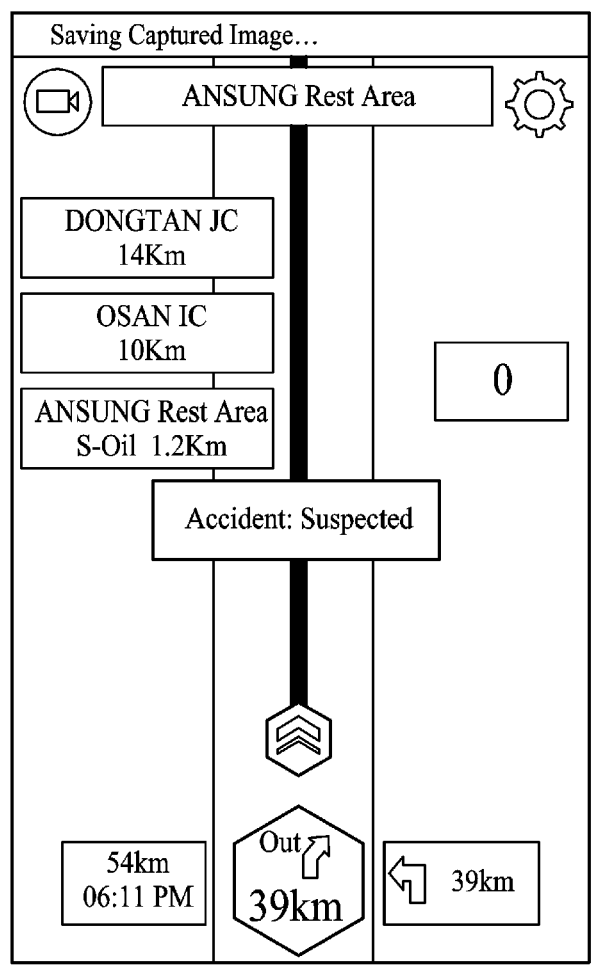
Figure 12C:
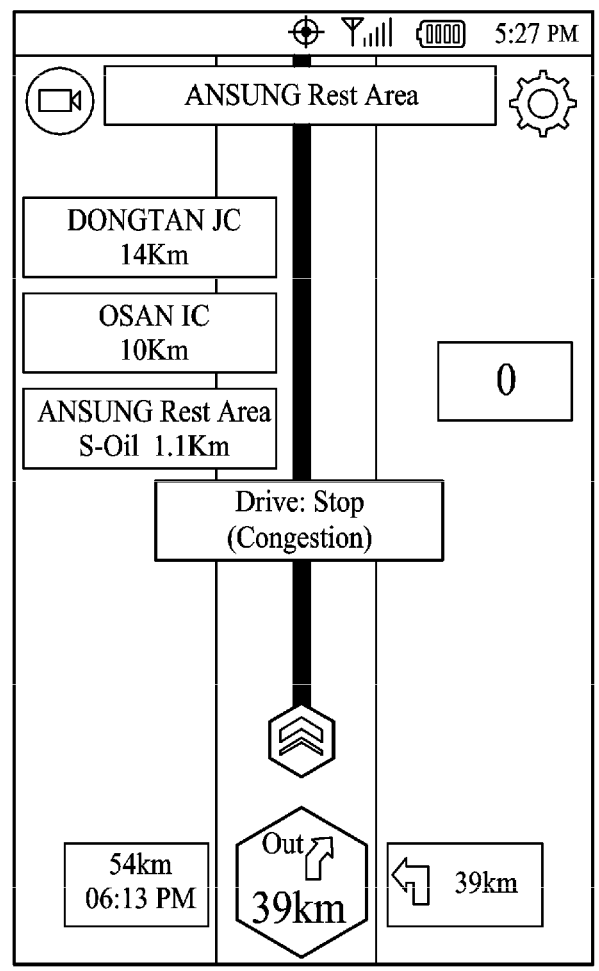
Figure 12D:
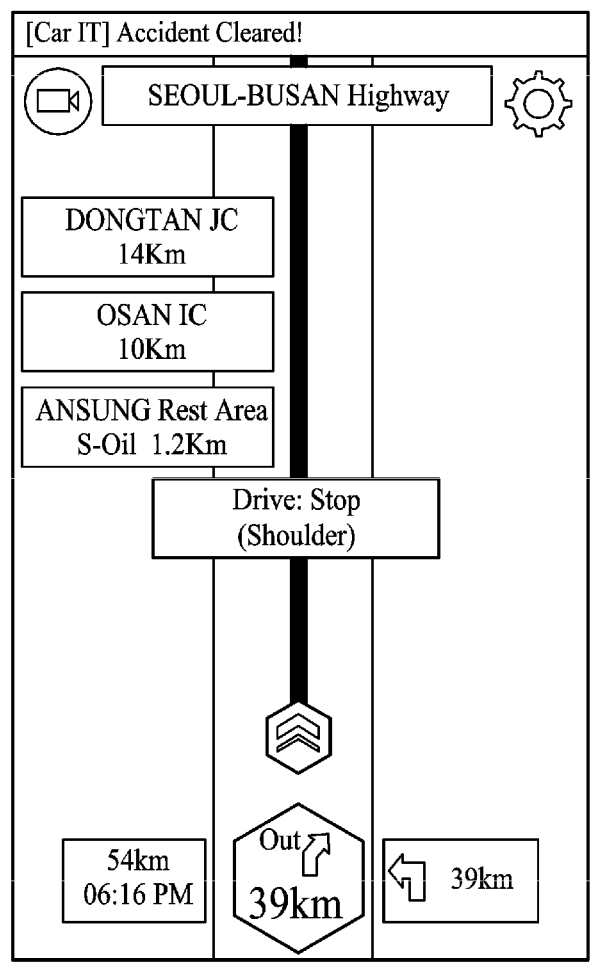
Figure 12E:
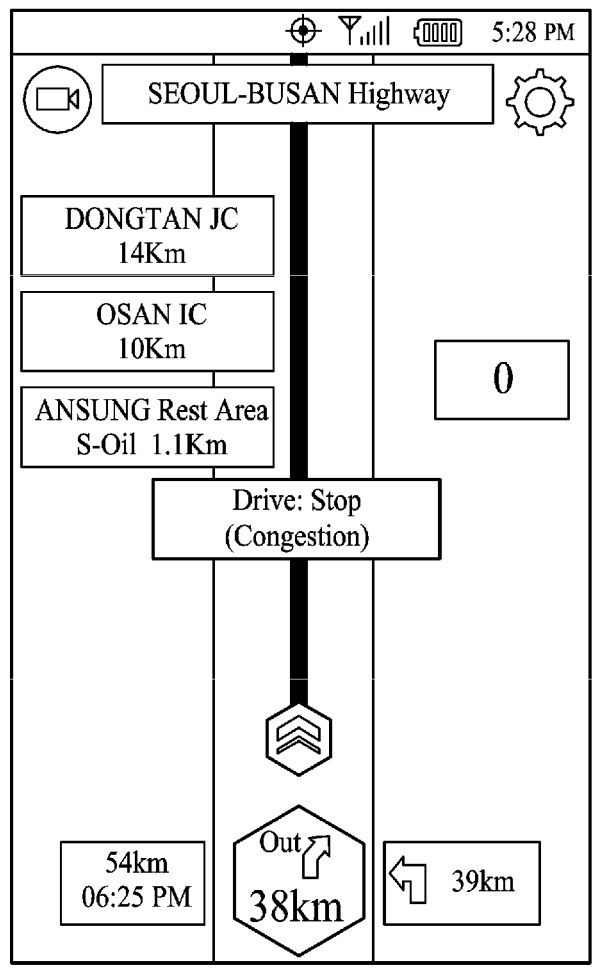
Figure 12F:
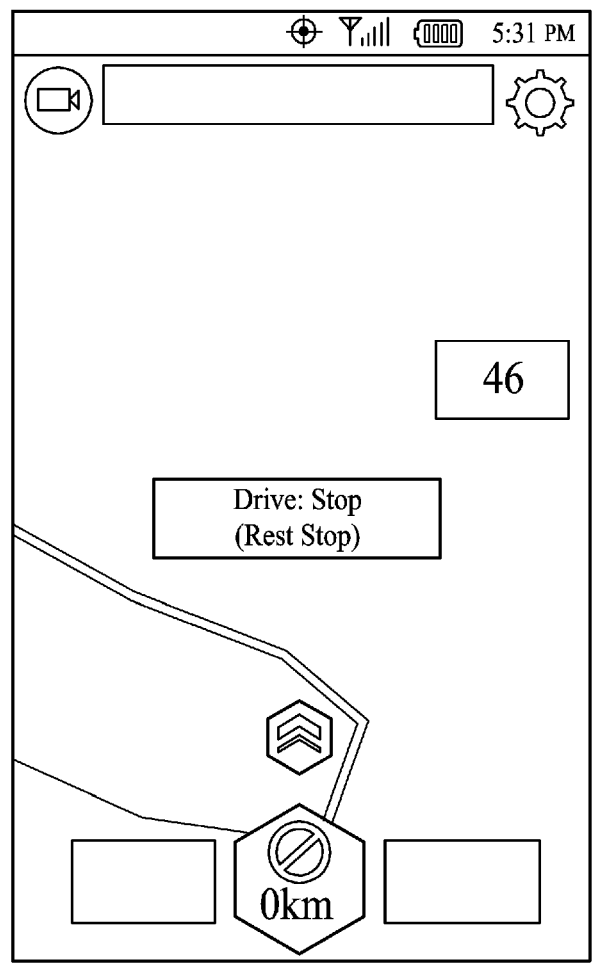

FIG. 11 is a flowchart of an accident determination algorithm with an improved determination in shadow area according to at least one embodiment. The terminal or vehicle condition turns to 'suspect of accident' upon determining an occurrence of an 'impact' at step S1110 as described in FIG. 10. If there is no switching to stop state, it is checked whether the vehicle is in a shadow area such as a tunnel, and if yes, it is determined again whether the vehicle is at stop state based on the change in position and measured value of the sum of accelerations. If it is finally determined to be the stop, the state switches to the 'occurrence of accident' at step S1120, and if the stop continues for longer than a predetermined time, the state turns to 'notify accident' at step S1130 for notifying the occurrence of accident to the accident analysis system. When the accident analysis system confirms the analyzed data to be an accident, the condition turns to 'accident assured' at step S1140. In addition, if a constant checking identifies a state conversion to 'drive', the state turns to 'notify accident cleared' at step S1150 to notify the accident analysis system of the cleared accident.

FIGS. 12A to 12F are diagrams of various display screens of a terminal for an accident detection and alert according to an embodiment. This example is implemented in a way of providing common navigation displays of POI such as rest area with additional speed, location and road information. The state of the vehicle is displayed as determined based on the provided traffic information, whether the vehicle is in drive and a determined impact. Though the illustrated states partially reflect classified drive states in Table 3 and the state to suspect of an accident as analyzed with accelerations, such display can be offered as the 'stop (intersection)' in Table 3.

Figure 13A:
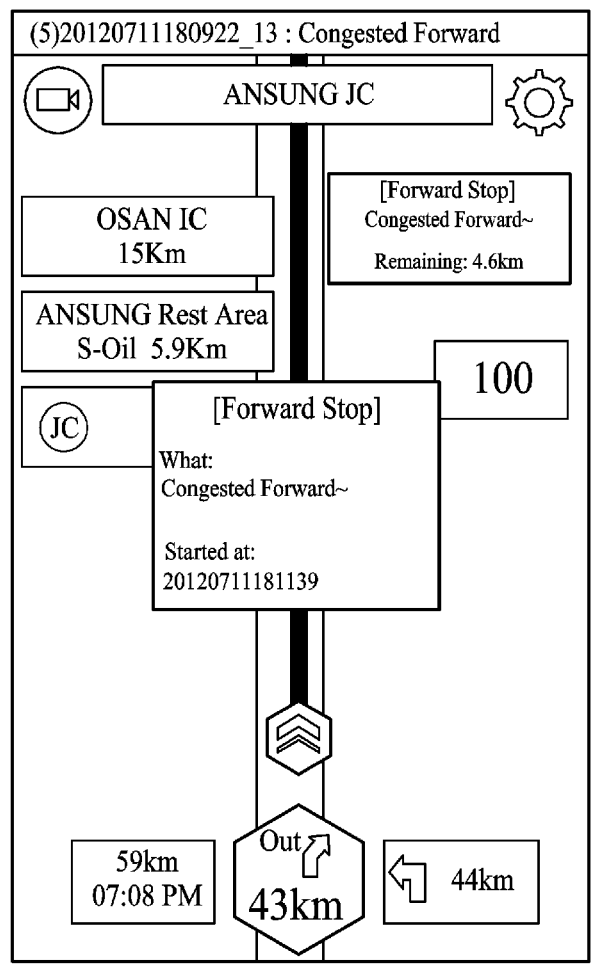
FIGS. 13A and 13B are diagrams of display screens of a terminal for an accident detection and alert according to an embodiment.
Figure 13B:
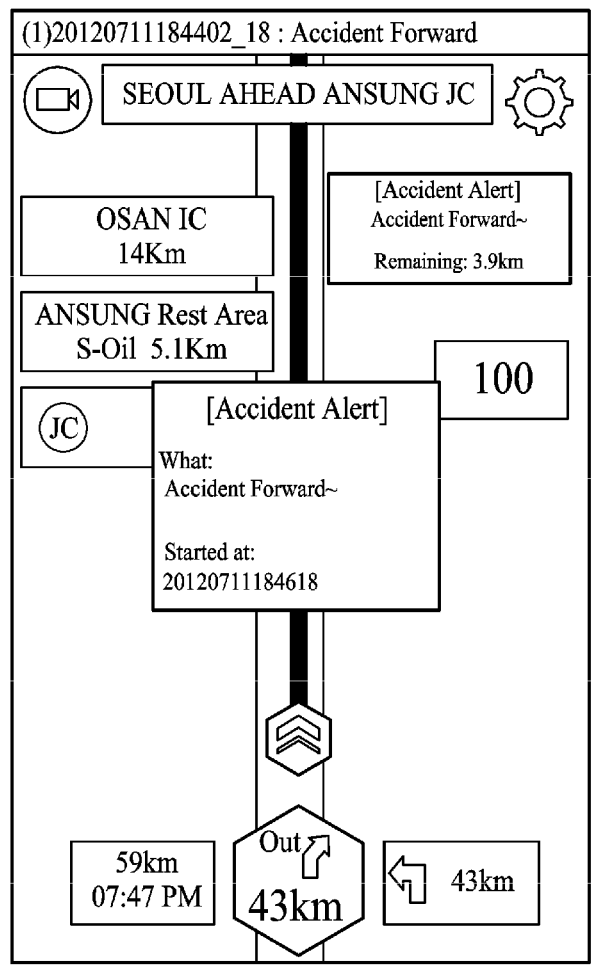

FIGS. 13A and 13B are diagrams of display screens of a terminal for an accident detection and alert according to an embodiment. If an impact occurs in the algorithm and it is confirmed as an accident, the news of accident is delivered to trailing vehicles in the direction of travel of the crashed vehicle. The content delivered are as determined by the algorithm and illustrated in the drawing including the details of the accident, the time and place of accident, whereby eliminating possible secondary accidents with the crashed vehicle in the traveling path as well as providing prediction of a traffic congestion.

According to the present embodiments as described above, an occurrence of accident is immediately analyzed to notify thereof to nearby or passing-by vehicles for preventing secondary accidents.

Although exemplary embodiments of the present disclosure have been described for illustrative purposes, those skilled in the art will appreciate that various modifications, additions and substitutions are possible, without departing from the various characteristics of the disclosure. Therefore, exemplary embodiments of the present disclosure have been described for the sake of brevity and clarity. Accordingly, one of ordinary skill would understand the scope of the disclosure is not limited by the explicitly described above embodiments but by the claims and equivalents thereof.

What is claimed is:

1. A system for preventing a secondary accident, comprising:
   a terminal configured to:
   have a global positioning system (GPS) navigation capability;
   monitor and display a driving state and an accident state of a vehicle;
   transmit information on the driving state and the accident state via a communication network; and
   display information received on a screen; and
   a server platform configured to:
   exchange information with the terminal;
   include an algorithm for determining an occurrence of an accident based on the information of the driving state and the accident state received from the terminal; and
   inform other terminals of the occurrence of the accident;
   wherein the information on the driving state comprises a speed of the vehicle, a location of the vehicle, and acceleration in three different directions of the vehicle; and
   wherein the algorithm includes instructions for:
   filtering each acceleration measured on X (rostrocaudal direction), Y (lateral direction), and Z (longitudinal direction) axes;
   summing the filtered accelerations;
   detecting an occurrence of an impact based on the summed acceleration; and
   determining whether the occurrence of the impact is caused by the occurrence of the accident.

2. The system of claim 1, the algorithm further includes an instruction for determining that the accident has cleared if the vehicle moves after detection of the impact.

3. The system of claim 1, the algorithm further includes an instruction for ignoring the occurrence of the impact if the direction of the impact is along the X-axis.

4. The system of claim 1, wherein the algorithm further includes instructions for:
   determining whether the vehicle is in a shadow area out of visibility of a global positioning system (GPS); and
   determining whether the vehicle is effectively stopped even if the speed of the vehicle is not exactly zero by referencing a location and the acceleration of the vehicle.

5. The system of claim 1, the algorithm further includes an instruction for detecting overturning of the vehicle by measuring gravitational acceleration along each of the X, Y, and Z axes.

6. A method for preventing a secondary accident which follows after a first accident of a vehicle, comprising:
   detecting an occurrence of an impact based on acceleration information in three different directions of the vehicle;
   in response to detecting the occurrence of the impact, determining whether the vehicle is stopped for a prescribed duration of time based on a speed of the vehicle;
   determining an occurrence of the accident if it is determined that the vehicle is stopped for the certain duration of time and confirming the occurrence of the accident based on determining whether trailing vehicles respective to the vehicle present a significant decrease in speed relative to leading vehicles respective to the vehicle if it is determined that the vehicle is stopped for the certain duration of time;
   detecting that the accident has occurred when trailing vehicles respective to the vehicle present a significant decrease in speed relative to leading vehicles respective to the vehicle; and
   notifying the occurrence of the accident to nearby vehicles of the vehicle if the accident is detected;
   wherein detecting the occurrence of the impact comprises:
   filtering each acceleration measured on X (rostrocaudal direction), Y (lateral direction), and Z (longitudinal direction) axes;
   summing the filtered accelerations; and
   detecting an occurrence of the impact by using the summed acceleration.

7. The method of claim 6, further comprising determining the accident to be cleared if the vehicle moves after the detecting of the occurrence of the impact.

8. The method of claim 6, wherein the determining whether the vehicle is stopped is skipped if the direction of the impact is along the X-axis.

9. The method of claim 6, wherein determining whether the vehicle is stopped comprises:
   determining whether the vehicle is in a shadow area out of visibility of a global positioning system (GPS); and
   determining whether the vehicle is effectively stopped even if the speed of the vehicle is not exactly zero by referencing a location and the acceleration of the vehicle.

10. The method of claim 6, further comprising detecting overturning of the vehicle by measuring gravitational acceleration along each of the X, Y, and Z axes.

11. A method for preventing a second accident with a secondary vehicle following a first accident involving a primary vehicle, the method comprising:
    detecting an impact involving the primary vehicle by: filtering each acceleration measured on X (rostrocaudal direction), Y (lateral direction), and Z (longitudinal direction) axes of the primary vehicle; summing the filtered accelerations; and using the summed acceleration to detect the impact;
    subsequent to detecting the impact, determining whether the primary vehicle is stopped for a predetermined period of time based on speed of the primary vehicle;
    detecting occurrence of the first accident if the primary vehicle is stopped for the predetermined period of time after the impact is detected, and confirming the occurrence of the first accident based on determining whether secondary vehicles trailing the primary vehicle decrease in speed relative to leading vehicles ahead of the primary vehicle; and
    notifying the secondary vehicles and leading vehicles of the accident.

12. The method of claim 11, further comprising detecting that the first accident has cleared when the primary vehicle moves after detecting the impact.

* * * * *